(12) United States Patent
Watanabe et al.

(10) Patent No.: US 8,292,778 B2
(45) Date of Patent: Oct. 23, 2012

(54) IDLE-STOP RESTART CONTROL SYSTEM

(75) Inventors: Tetsushi Watanabe, Chiyoda-ku (JP); Masaaki Taruya, Chiyoda-ku (JP); Katsuya Tsujimoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 464 days.

(21) Appl. No.: 12/715,893

(22) Filed: Mar. 2, 2010

(65) Prior Publication Data

US 2011/0049880 A1    Mar. 3, 2011

(30) Foreign Application Priority Data

Sep. 3, 2009   (JP) ................................. 2009-203483

(51) Int. Cl.
*B60K 1/02* (2006.01)
*B60W 10/04* (2006.01)
(52) U.S. Cl. ........................ 477/3; 180/65.285
(58) Field of Classification Search . 477/3; 180/65.265, 180/65.275, 65.28, 65.285; 123/179.4
See application file for complete search history.

(56) References Cited

U.S. PATENT DOCUMENTS

| | | | | |
|---|---|---|---|---|
| 6,453,864 B1 * | 9/2002 | Downs et al. | ............ | 123/179.3 |
| 6,558,290 B2 * | 5/2003 | Phillips et al. | ................... | 477/5 |
| 6,802,796 B2 * | 10/2004 | Asa et al. | ........................ | 477/3 |
| 7,410,445 B2 * | 8/2008 | Surewaard et al. | ............. | 477/22 |
| 7,477,031 B2 * | 1/2009 | Ogata et al. | .................. | 318/430 |
| 7,669,569 B2 * | 3/2010 | Tamai et al. | ............... | 123/179.4 |
| 2006/0166783 A1 * | 7/2006 | Tamai et al. | ...................... | 477/7 |
| 2010/0216596 A1 * | 8/2010 | Kaltenbach | ................... | 477/118 |
| 2011/0178662 A1 * | 7/2011 | Sime et al. | ...................... | 701/22 |

FOREIGN PATENT DOCUMENTS

| | | | | |
|---|---|---|---|---|
| JP | 07-115791 A | | 5/1995 | |
| JP | 2004190585 A | * | 7/2004 | ............... 180/65.275 |

* cited by examiner

*Primary Examiner* — Roger Pang
(74) *Attorney, Agent, or Firm* — Sughrue Mion, PLLC

(57) ABSTRACT

The idle-stop restart control system includes: a sensorless synchronous motor-generator which operates as a generator and a starting motor; an induced-signal detecting circuit for detecting an induced signal output from an armature winding; a field drive circuit for controlling energization of a field winding; and a restart control circuit output, to the field drive circuit, a drive signal for controlling the energization of the field winding to amplify the induced signal while calculating the number of revolutions and an angular position of a rotor based on the detected induced signal when an engine stop command is input and a level of the detected induced signal is equal to or less than a predetermined value and output the drive signal for controlling the energization of the armature winding to restart the engine based on the calculated number of revolutions and angular position of the rotor when a restart command is input.

4 Claims, 7 Drawing Sheets

IDLE-STOP RESTART CONTROL SYSTEM

BACKGROUND OF THE INVENTION

1. Field of the Invention

The present invention relates to an idle-stop restart control system mounted mainly on a vehicle, for controlling restart of an internal combustion engine (engine) after idle stop by using a sensorless synchronous motor-generator which operates as a generator after the restart of the engine and also operates as a starting motor when the engine is to be restarted after the idle stop. The sensorless synchronous motor-generator does not use a position sensor for detecting a position of a rotor.

2. Description of the Related Art

In recent years, in vehicles using the internal combustion engine as a power source, idle stop is increasingly introduced for the purposes of improving fuel efficiency and reducing an exhaust gas. For further introduction of the idle stop, various idle-stop systems have been proposed.

As a method of calculating the position of the rotor based on estimation to control energization of an armature winding without a sensor for detecting the position of the rotor in an on-vehicle three-phase motor, a technique of controlling a sensorless brushless motor for driving a compressor for air conditioner, which is used for an electric automobile controller, has been reported (for example, see JP 07-115791 A).

However, the related art has the following problem. In a so-called self-control operation as in the conventional example described above, an induced voltage generated on the armature side is detected. From the detected induced voltage, the number of revolutions and an angular position of the rotor are calculated based on estimation. Based on the thus calculated number of revolutions and angular position of the rotor, the energization of the armature is controlled at optimal timing.

With a small number of revolutions which does not allow the energization to be controlled by the self-control operation described above, a motor is started by prospective control. In the prospective control, a rotational magnetic flux is forcibly applied to the armature, expecting that the rotor follows the rotational magnetic flux. This method is called an external control operation.

The self-control operation and the external control operation are known. The motor which can be started by the external control operation is limitedly used only when a load torque at the time of start is relatively small. Therefore, a starting motor for an internal combustion engine, with an extremely large load torque, cannot be started by the external control operation.

SUMMARY OF THE INVENTION

The present invention has been made to solve the problem described above, and has an object to provide an idle-stop restart control system capable of enlarging the range of detection of an induced signal, which is induced in and output from an armature winding of a sensorless synchronous motor-generator, by an induced-signal detecting circuit by controlling energization of a field winding of a rotor of the sensorless synchronous motor-generator with a field drive circuit to amplify the induced signal.

The present invention has another object to provide the idle-stop restart control system capable of enlarging the range of the number of revolutions and an angular position of the rotor, which can be calculated by a restart control circuit based on the induced signal, to a limit number of revolutions and a corresponding angular position immediately before a full stop by enlarging the range of detection of the induced signal, which, in turn, can enlarge the range of operation allowing for a self-control operation to immediately before the full stop.

An idle-stop restart control system according to the present invention includes: a sensorless synchronous motor-generator including an armature winding and a rotor including a field winding, the sensorless synchronous motor-generator operating as a generator after start of an engine and operating as a starting motor when the engine is restarted after idle stop; an induced-signal detecting circuit for detecting an induced signal output from the armature winding; a field drive circuit for controlling energization of the field winding; and a restart control circuit being configured to: output, to the field drive circuit, a drive signal for controlling the energization of the field winding to amplify the induced signal while calculating a number of revolutions and an angular position of the rotor based on the induced signal detected by the induced-signal detecting circuit when an engine stop command is input and a level of the induced signal detected by the induced-signal detecting circuit is equal to or less than a predetermined value; and output the drive signal for controlling the energization of the armature winding to restart the engine based on the calculated number of revolutions and angular position of the rotor when a restart command is input.

According to the idle-stop restart control system of the present invention, the energization of the field winding of the rotor of the sensorless synchronous motor-generator is controlled by the field drive circuit to amplify the induced signal. As a result, the range of detection of the induced signal which is induced in and output from the armature winding of the sensorless synchronous motor-generator by the induced-signal detecting circuit can be enlarged.

Moreover, the enlarged range of detection of the induced signal allows the range of the number of revolutions and the angular position of the rotor, which can be calculated by the restart control circuit based on the induced signal, to be enlarged to the limit number of revolutions and the corresponding angular position immediately before the full stop, which, in turn, can enlarge the range of operation allowing for the self-control operation to immediately before the full stop.

DETAILED DESCRIPTION OF THE PREFERRED EMBODIMENTS

Hereinafter, a preferred embodiment of an idle-stop restart control system of the present invention is described with reference to the accompanying drawings.

First Embodiment

Figure 1:
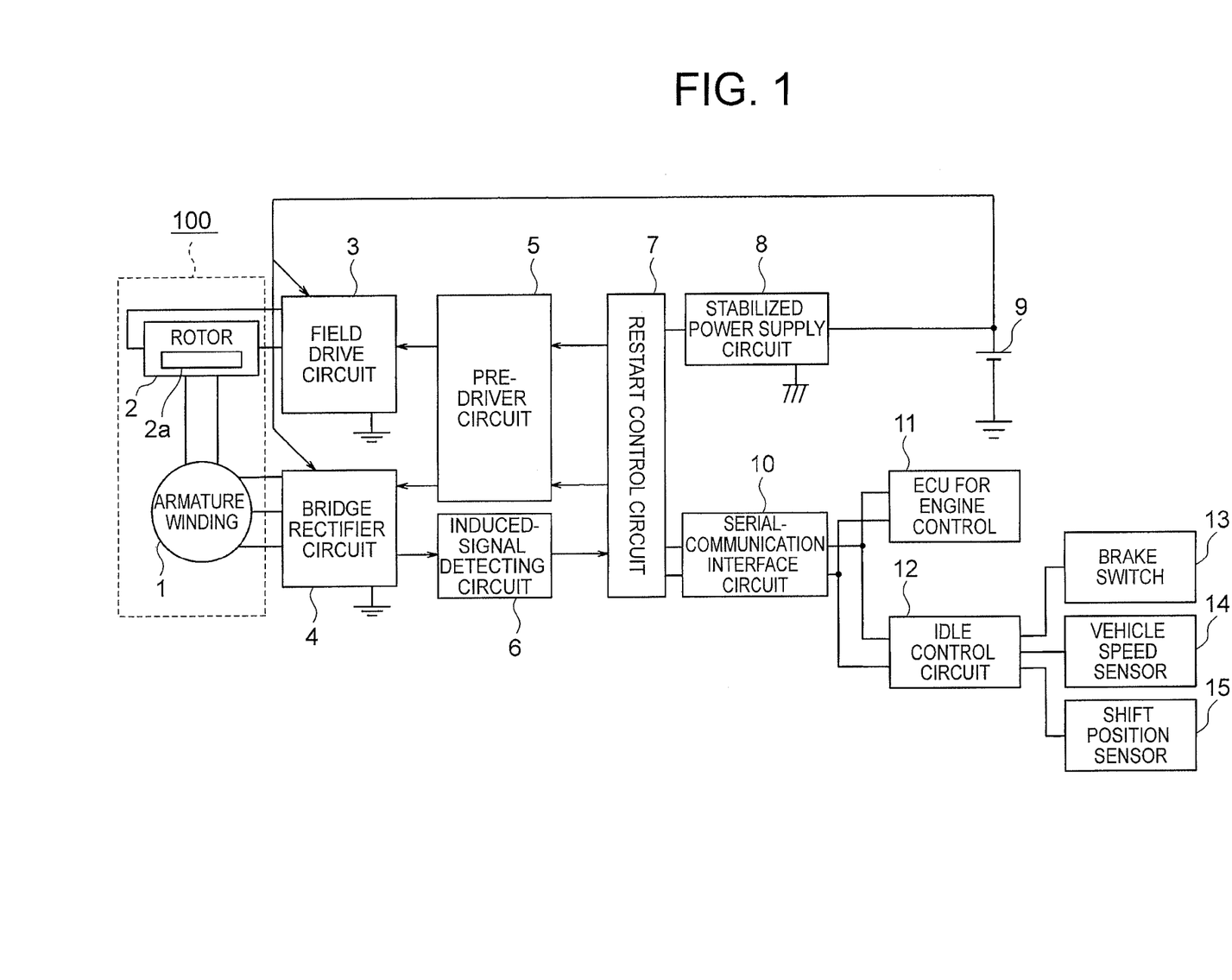
FIG. 1 is a diagram illustrating a configuration of an idle-stop restart control system according to a first embodiment of the present invention.

An idle-stop restart control system according to a first embodiment of the present invention is described with reference to FIGS. 1 to 7. FIG. 1 is a diagram illustrating a configuration of the idle-stop restart control system according to the first embodiment of the present invention.

As illustrated in FIG. 1, the idle-stop restart control system includes: an armature winding 1; a rotor 2 including a field winding 2a; a field drive circuit 3; abridge rectifier circuit 4; a pre-driver circuit 5; an induced-signal detecting circuit 6; a restart control circuit 7; a stabilized power supply circuit 8 for the restart control circuit 7; an on-vehicle battery 9; a serial-communication interface circuit 10; an electronic control unit (ECU) 11 for engine control; an idle control circuit 12; a brake switch 13; a vehicle speed sensor 14; and a shift position sensor 15. The armature winding 1 and the rotor 2 constitute a sensorless synchronous motor-generator 100. The field drive circuit 3 has a function of energizing the field winding 2a and controls energization of the field winding 2a to amplify an induced signal. The bridge rectifier circuit 4 has both a function of energizing the armature winding 1 and a function of extracting electric power generated by the sensorless synchronous motor-generator 100. The pre-driver circuit 5 converts a voltage of a drive signal and the like. The induced-signal detecting circuit 6 detects an induced signal output from the armature winding 1. The restart control circuit 7 such as a micro-computer includes a memory. The serial-communication interface circuit 10 is for communicating with an electronic device described below. The idle control circuit 12 is an ECU or the like independent of the ECU 11 for engine control. The brake switch 13 detects a brake operation. The vehicle speed sensor 14 detects a speed of a vehicle. The shift position sensor 15 detects a position of a shift lever.

The electric power generated by the sensorless synchronous motor-generator 100 passes through the bridge rectifier circuit 4 and a charging circuit (not shown) to charge the on-vehicle battery 9. The restart control circuit 7, the ECU 11 for engine control, and the idle control circuit 12 are connected through a vehicle network communication line.

Of a conventional motor dedicated for restart (not shown) and a conventional generator (not shown) which are mounted on the vehicle, the sensorless synchronous motor-generator 100 according to the first embodiment replaces the conventional generator. The conventional motor dedicated for restart is used for normal engine start using ON of an ignition key as a trigger. The conventional generator charges the on-vehicle battery 9.

The rotor 2 of the sensorless synchronous motor-generator 100 rotates at a rate (for example, about a double rate=about 1,400 rpm) equal to a multiple corresponding to a speed-up rate of a belt (not shown) which connects an internal combustion engine (hereinafter, referred to simply as an engine) rotating at the number of revolutions during idling (for example, about 700 rpm) and the sensorless synchronous motor-generator 100 to each other.

Figure 2:
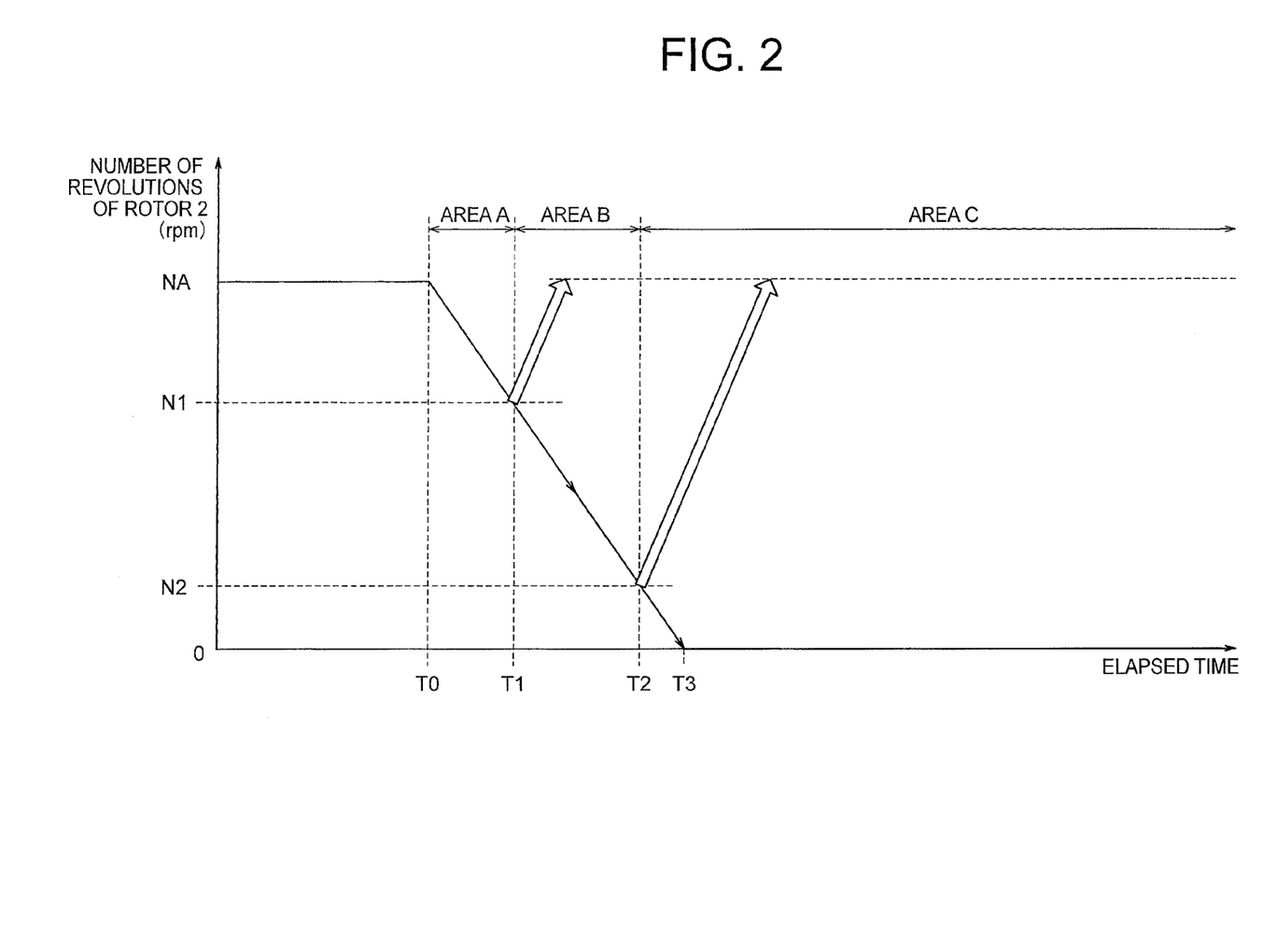
FIG. 2 is a timing chart illustrating an operation of a sensorless synchronous motor-generator of the idle-stop restart control system according to the first embodiment of the present invention from idle stop to restart.

FIG. 2 is a timing chart illustrating an operation of the sensorless synchronous motor-generator of the idle-stop restart control system according to the first embodiment of the present invention from idle stop to restart. In FIG. 2, an abscissa axis represents an elapsed time, whereas an ordinate axis represents the number of revolutions of the rotor 2 of the sensorless synchronous motor-generator 100.

A time T0 corresponds to a time at which an engine stop procedure is performed by the ECU 11 for engine control during idling. Before the time T0, the engine is in an idling state and is operated at the number of revolutions during idling. The rotor 2 of the sensorless synchronous motor-generator 100 rotates at the number of revolutions NA corresponding to the number of revolutions of the engine during idling.

A time T1 corresponds to a time in the middle of an engine stop process. From the time T0 to the time T1, the engine rotates at the number of revolutions of the engine, which allows the engine to be restarted by recovery of fuel control and ignition control with a self-rotating force, that is, allows for self-recovery of the engine. The number of revolutions of the rotor 2 of the sensorless synchronous motor-generator 100, which corresponds to a limit number of revolutions of the engine at the time T1, allowing for self-recovery, is determined as a first threshold value N1. An area between the time T0 and the time T1 is determined as an area A.

After that, the number of revolutions of the engine further decreases. A time T2 corresponds to another time in the middle of the engine stop process. At the time T2, the number of revolutions of the engine reaches a limit number of revolutions of the engine, which corresponds to a limit allowing for the detection of the induced signal induced in and output from the armature winding 1. The number of revolutions of the rotor 2 of the sensorless synchronous motor-generator 100, which corresponds to the limit number of revolutions of the engine at the time T2, is determined as a second threshold value N2. Here, the limit number of revolutions of the engine corresponds to the limit which allows for the detection of the induced signal. An area between the time T1 and the time T2 is determined as an area B.

A time T3 corresponds to a time at which the engine and the sensorless synchronous motor-generator 100 fully stop. After the time T3, the engine restarts from a full-stop state. A time period between the time T2 and the time T3 is extremely short. Therefore, as in the case of the time after the time T3, the engine restarts from the full-stop state during the time period between the time T2 and the time T3. An area after the time T2 is determined as an area C.

Figure 3:
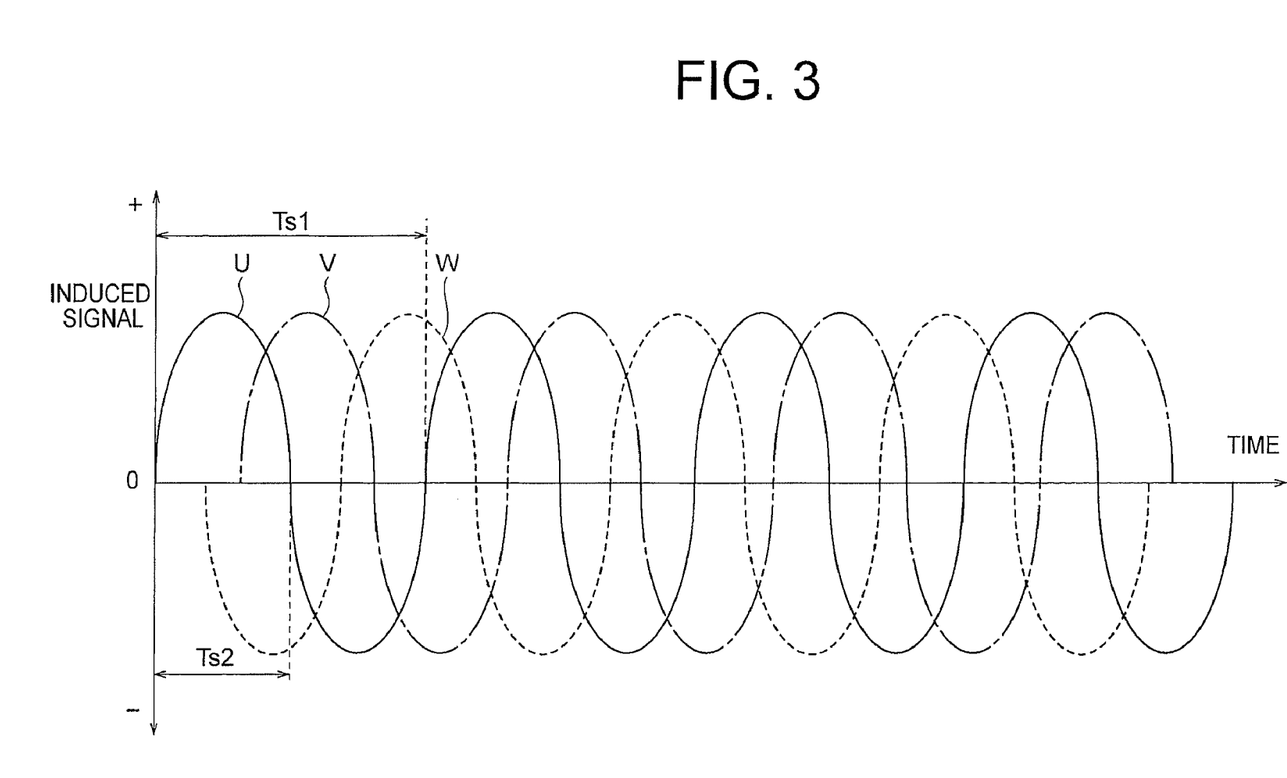
FIG. 3 is a timing chart illustrating induced signals output in respective phases of an armature winding of the sensorless synchronous motor-generator in an area A.

FIG. 3 is a timing chart illustrating the induced signals output in the respective phases of the armature winding of the sensorless synchronous motor-generator in the area A. In FIG. 3, an abscissa axis represents time, whereas an ordinate axis represents a level of each of the induced signals. Note that, the induced signal is an induced voltage or an induced current. Further, in FIG. 3, an output cycle of the induced signal for one phase is Ts1, whereas a half cycle is Ts2.

Figure 4:
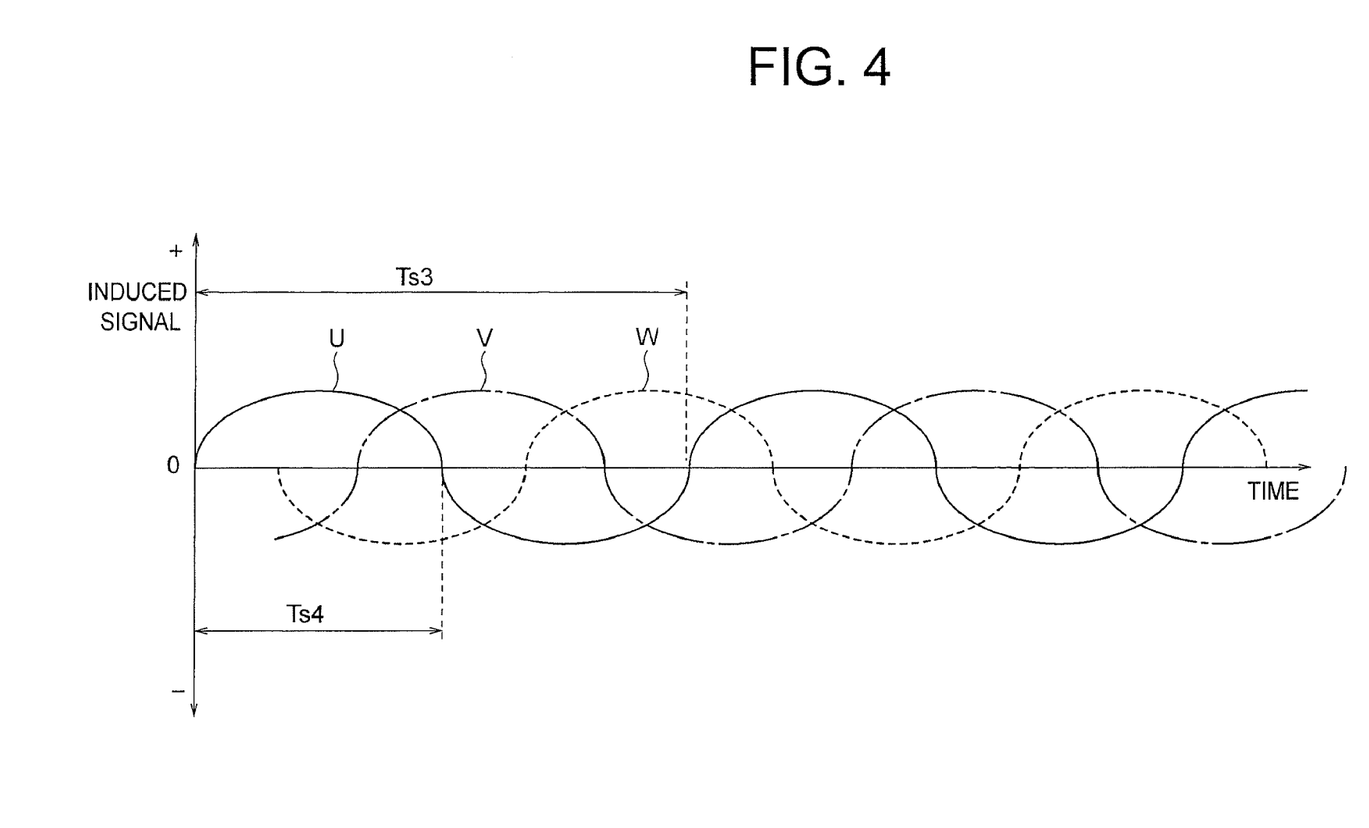
FIG. 4 is a timing chart illustrating the induced signals output in the respective phases of the armature winding of the sensorless synchronous motor-generator in an area B.

FIG. 4 is a timing chart illustrating the induced signals output in the respective phases of the armature winding of the sensorless synchronous motor-generator in the area B. In FIG. 4, an abscissa axis represents time, whereas an ordinate axis represents a level of each of the induced signals. In comparison with the induced signals in the area A which is illustrated in FIG. 3, the area B corresponds to the process in which the engine and the rotor 2 of the sensorless synchronous motor-generator 100 are coming to the full stop. Thus, the number of revolutions of the rotor 2 is small, and therefore the level of each of the induced signals is lower than that in the area A. An output cycle of the induced signal for one phase is Ts4. Due to reduction in number of revolutions, the relations Ts1<Ts3 and Ts2<Ts4 are established.

Figure 5:
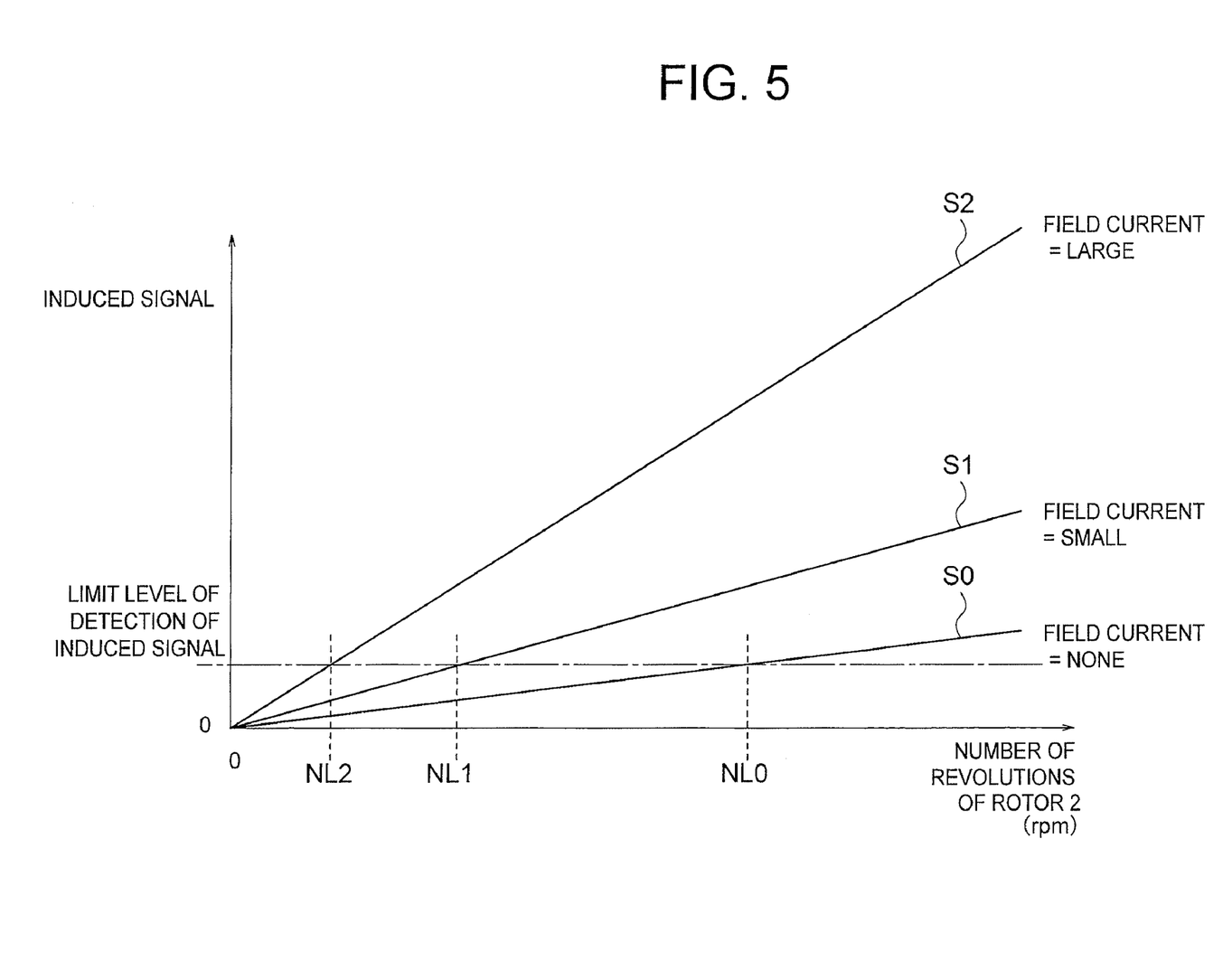
FIG. 5 is a graph illustrating a relation of the induced signal with respect to the number of revolutions of a rotor when the sensorless synchronous motor-generator rotates at low speed.

FIG. 5 is a graph illustrating a relation of the induced signal with respect to the number of revolutions of the rotor when the sensorless synchronous motor-generator rotates at a low speed. In FIG. 5, an abscissa axis represents the number of revolutions of the rotor 2 of the sensorless synchronous motor-generator 100, whereas an ordinate axis represents a peak level of the induced signal. A solid line S0 indicates the induced signal with no field current, a solid line S1 indicates the induced signal when a field current is small, and a solid line S2 indicates the induced signal when the field current is large. From the induced signal, the number of revolutions of the rotor 2 of the sensorless synchronous motor-generator 100 can be calculated. Each of points NL0, NL1, and NL2 on the abscissa axis indicates the number of revolutions of the rotor 2 at a limit level of detection of the induced signal (on the ordinate axis), which corresponds to the limit allowing for detection of the induced signal by the induced-signal detecting circuit 6. The point NL0 indicates the number of revolutions of the rotor 2 with no field current, the point NL1 indicates the number of revolutions when the field current is small, and the point NL2 indicates the number of revolutions when the field current is large. As illustrated in FIG. 5, the induced signal is amplified by increasing the field current. As a result, the induced signal can be detected even when the rotor 2 rotates at a smaller number of revolutions. The number of revolutions NL2 immediately before the full stop is identical with the second threshold value N2 illustrated in FIG. 2.

Next, an operation of the idle-stop restart control system according to the first embodiment is described with reference to the drawings.

Figure 6:
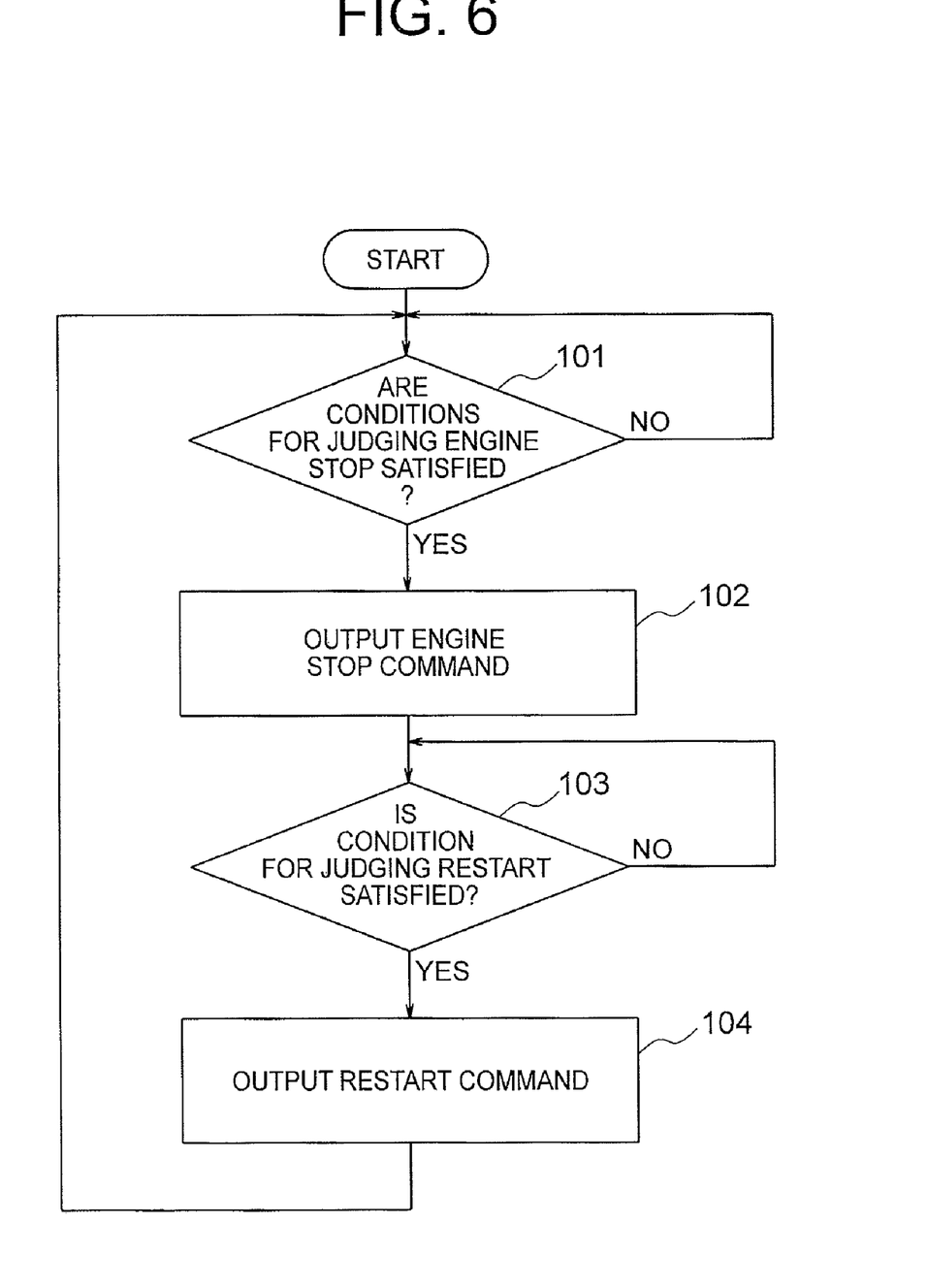
FIG. 6 is a flowchart illustrating an operation of an idle control circuit of the idle-stop restart control system according to the first embodiment of the present invention.
Figure 7:
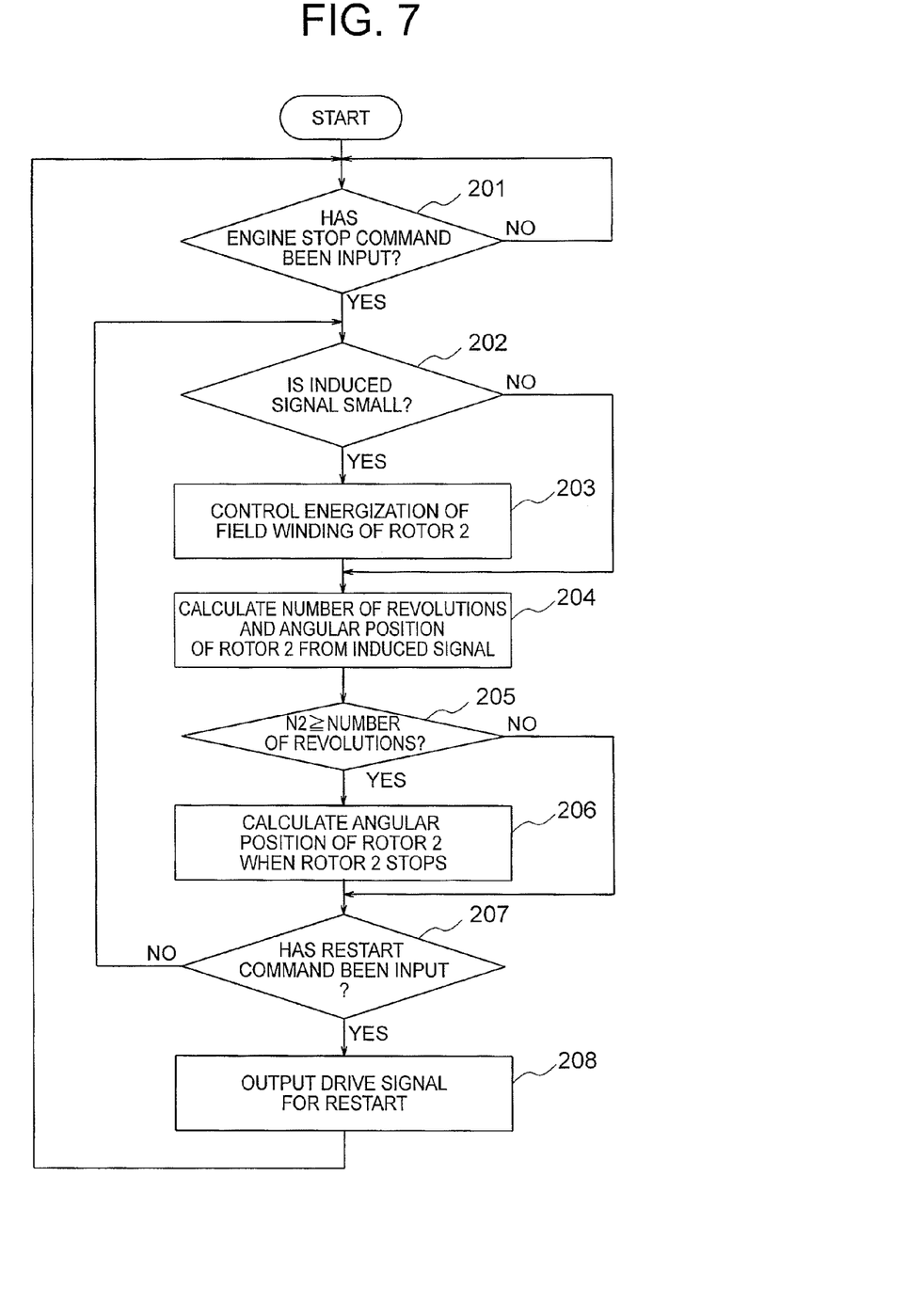
FIG. 7 is a flowchart illustrating an operation of a restart control circuit of the idle-stop restart control system according to the first embodiment of the present invention.

FIG. 6 is a flowchart illustrating an operation of the idle control circuit of the idle-stop restart control system according to the first embodiment of the present invention. FIG. 7 is a flowchart illustrating an operation of the restart control circuit of the idle-stop restart control system according to the first embodiment of the present invention.

In Step 101 illustrated in FIG. 6, the idle control circuit 12 determines whether or not conditions for judging engine stop are satisfied during idling. It is determined that the conditions for judging the engine stop are satisfied when the brake switch 13 is ON, the vehicle speed detected by the vehicle speed sensor 14 is zero, and the position of the shift lever of an automatic transmission (AT), which is detected by the shift position sensor 15, is placed in an N-range. On the other hand, when even any one of the three conditions is not satisfied, it is determined that the conditions for judging the engine stop are not satisfied.

The vehicle is stopped by a brake operation performed while the vehicle is being operated to run. By the brake operation, the brake switch 13 is turned ON. The condition for judging the engine stop may also be the placement of the position of the shift lever in a P-range, which position causes the vehicle to continuously stop. Moreover, the type of transmission is not limited to the AT, and a manual transmission (MT) may be used instead.

Next, if the conditions for judging the engine stop are satisfied (YES), the idle control circuit 12 outputs an engine stop command in Step 102. The idle control circuit 12 outputs the engine stop command to the ECU 11 for engine control through the vehicle network communication line and also to the restart control circuit 7 through the vehicle network communication line and the serial-communication interface circuit 10.

Based on the engine stop command, the ECU 11 for engine control stops the ignition control and the fuel control for the engine. This operation of stopping the ignition control and the fuel control corresponds to the engine stop procedure and is performed at the time T0 illustrated in FIG. 2. The number of revolutions of the rotor 2 of the sensorless synchronous motor-generator 100 follows a rotation behavior of the engine to decrease from the number of revolutions during idling until the full stop of the engine, that is, from the number of revolutions NA, to the number of revolutions N1, then to the number of revolutions N2, and finally to zero as illustrated in FIG. 2.

Next, in Step 103, the idle control circuit 12 determines whether or not a condition for judging restart is satisfied. When even any one of the conditions for judging the restart is not satisfied, it is determined that the condition for judging restart is satisfied. For example, if the position of the shift lever of the AT, which is detected by the shift position sensor 15, is shifted to a D-range, it is determined that the condition for judging the restart is satisfied. On the other hand, when the conditions for judging the engine stop are satisfied, it is determined that the condition for judging the restart is not satisfied.

Next, if the condition for judging the restart is satisfied (YES), the idle control circuit 12 outputs a restart command in Step 104. The idle control circuit 12 outputs the restart command to the ECU 11 for engine control through the vehicle network communication line and to the restart control circuit 7 through the vehicle network communication line and the serial-communication interface circuit 10.

The ECU 11 for engine control starts the ignition control and the fuel control for the engine based on the restart command.

Although the execution of the process of determining whether or not the conditions for judging the engine stop or the condition for judging the restart are (is) satisfied (Steps 101 to 104) in the idle control circuit 12 has been described, the process may also be executed in the ECU 11 for engine control to which a necessary information source is connected.

In Step 201 illustrated in FIG. 7, the restart control circuit 7 determines whether or not the engine stop command has been input from the idle control circuit 12.

Next, if the engine stop command has been input (YES), the restart control circuit 7 determines whether or not the peak level of the induced signal detected and input by the induced-signal detecting circuit 6 is a predetermined value or less in Step 202. The predetermined value corresponds to the peak level of the induced signal, which is detected when the number of revolutions of the rotor 2 illustrated in FIG. 2 is the first threshold value N1.

Subsequently, in Step 203, if the level of the induced signal is the predetermined value or less (YES), the restart control circuit 7 controls energization of the field winding 2a of the rotor 2. In order to amplify the induced signal, the restart control circuit 7 outputs a drive signal for controlling the energization of the field winding 2a. The drive signal passes through the pre-driver circuit 5 to reach the field drive circuit 3. The field drive circuit 3 controls the energization of the field winding 2a based on the drive signal so that the amplified induced signal S2 illustrated in FIG. 5 is induced and output.

Next, in Step 204, the restart control circuit 7 calculates the number of revolutions and an angular position of the rotor 2 from the induced signal detected and input by the induced-signal detecting circuit 6 and then stores the calculated number of revolutions and angular position in the memory. The number of revolutions and the angular position calculated for each processing cycle are stored one by one in the memory in time-series.

Before the area A illustrated in FIG. 2, the rotor 2 rotates at the number of revolutions NA according to the number of revolutions of the engine during idling.

In the area A illustrated in FIG. 2, the number of revolutions of the rotor 2 gradually decreases. A state of the induced signal output to the armature winding 1 at this time is illustrated in FIG. 3. The angular position of the rotor 2 can be calculated from the amount of change in the induced signal output in each of the phases, whereas the cycle of rotation (=the number of revolutions) of the rotor 2 can be calculated from the output cycle Ts1 or the half cycle Ts2 of the induced signal.

When the induced signal is an induced voltage, the number of revolutions of the rotor 2 can be calculated from a time (the end of the output cycle Ts1 or the half cycle Ts2) at which the voltage passes through 0V in a U-phase as illustrated in FIG. 3. At the point of 0V (at the end of the output cycle Ts1 or the half cycle Ts2) through which the induced voltage passes, an electric angle between the armature and the rotor 2 becomes 180 degrees or 360 degrees. Therefore, from the output cycle Ts1 or the half cycle Ts2, the angular position of the rotor 2 can also be calculated simultaneously with the calculation of the number of revolutions.

In the area B illustrated in FIG. 2, the number of revolutions of the rotor 2 decreases to the full stop. A state of the induced signal output to the armature winding 1 at this time is illustrated in FIG. 4. In the area B, although the number of revolutions of the rotor 2 decreases to gradually lower the level of the induced signal, the induced signal is output to the armature winding 1 until the full stop. Therefore, the continuous detection of the induced signal allows the angular position and the number of revolutions of the rotor 2 to be calculated from the amount of change in the induced signal and the output cycle Ts3 or the half cycle Ts4 in the manner as described above until the number of revolutions decreases to the limit number of revolutions (second threshold value N2 illustrated in FIG. 2) corresponding to the limit allowing for detection of the induced signal.

Next, in Step 205, the restart control circuit 7 determines whether or not a current number of revolutions of the rotor 2, which is calculated in Step 204, is equal to or less than the second threshold value N2.

Next, in Step 206, if the number of revolutions is equal to or less than the second threshold value N2 (YES), the restart control circuit 7 calculates the angular position of the rotor 2 when the rotor 2 stops and stores the calculated angular position when the rotor 2 stops in the memory. As described above for Step 204, the calculated angular positions and numbers of revolutions of the rotor 2 are stored in the memory until the number of revolutions decreases to the limit number of revolutions (second threshold value N2) corresponding to the limit allowing for detection of the induced signal by the induced-signal detecting circuit 6. Therefore, from the relation between the angular position and the number of revolutions of the rotor 2 at the elapsed time (T0-T1-T2), the angular position of the rotor 2 when the rotor 2 stops, at the time T3, at which the number of revolutions is zero, can be calculated.

Specifically, as illustrated in FIG. 2, the elapsed time T3, at which the number of revolutions is zero, can be calculated from the relation between the change in number of revolutions of the rotor 2 and the elapse of the time (T0-T1-T2). Moreover, the angular position of the rotor 2 when the rotor 2 stops at the elapsed time T3 can be calculated from the relation between the elapse of the time (T0-T1-T2) and the change in angular position of the rotor 2.

Next, in Step 207, the restart control circuit 7 determines whether or not the restart command has been input from the idle control circuit 12. If the restart command has not been input (NO), the restart control circuit 7 waits (delays the determination of the input of the restart command) for a predetermined time after the processing in Step 206 is executed once and then determines again whether or not restart command has been input.

Next, if the restart command has been input (YES), the restart control circuit 7 outputs a drive signal for controlling the energization of the armature winding 1 to restart the engine in Step 208. In this step, the restart control circuit 7 clears the memory storing the numbers of revolutions and the angular positions.

When the elapsed time is in the area A, specifically, the number of revolutions of the rotor 2, which is calculated in Step 204, is larger than the first threshold value N1, the number of revolutions of the engine is that allows for the self-recovery of the engine. Therefore, the engine can be restarted by re-control (the ignition control and the fuel control for the engine) performed by the ECU 11 for engine control. Thus, the restart control circuit 7 does not execute the restart of the engine in the area A.

In the area B, specifically, when the number of revolutions of the rotor 2, which is calculated in Step 204, is equal to or smaller than the first threshold value N1 and larger than the second threshold value N2, the restart control circuit 7 executes the restart of the engine based on the current number of revolutions and angular position of the rotor 2, which are calculated in Step 204. For restarting the engine, the restart control circuit 7 outputs the drive signal for controlling the energization of the armature winding 1 of the sensorless synchronous motor-generator 100. The drive signal for restart, which is output from the restart control circuit 7, passes through the pre-driver circuit 5 and the bridge rectifier circuit 4 to flow through the armature winding 1 as an armature current, thereby restarting the engine.

In the area C, specifically, when the number of revolutions of the rotor 2, which is calculated in Step 204, is equal to or smaller than the second threshold value N2 or zero (full stop), the restart control circuit 7 executes the restart of the engine based on the angular position of the rotor 2 when the rotor 2 stops, which is calculated in Step 206. For restarting the engine, the restart control circuit 7 outputs the drive signal for controlling the energization of the armature winding 1 of the sensorless synchronous motor-generator 100.

The ECU 11 for engine control can detect a failure in restart performed by the restart control circuit 7 using the sensorless synchronous motor-generator 100 from the number of revolutions of the engine after the input of the restart command or the like. In the case where the restart using the sensorless synchronous motor-generator 100 has failed, the ECU 11 for engine control performs restart using an independently provided motor dedicated for restart as a backup of the restart control circuit 7.

As described above, according to the first embodiment of the present invention, the energization of the field winding 2a of the rotor 2 of the sensorless synchronous motor-generator 100 is controlled by the field drive circuit 3 to amplify the induced signal. As a result, the range of detection of the induced signal induced in and output from the armature winding 1 of the sensorless synchronous motor-generator 100 by the induced-signal detecting circuit 6 can be enlarged.

Moreover, the enlargement of the range of detection of the induced signal allows the range of the number of revolutions and the angular position of the rotor 2, which can be calculated by the restart control circuit 7 based on the induced signal, to be enlarged to the second threshold value N2 and the corresponding angular position immediately before the full stop, which, in turn, can enlarge the range of operation allowing for the self-control operation to immediately before the full stop.

Furthermore, the enlargement of the range of the calculable number of revolutions and angular position of the rotor 2 to immediately before the full stop allows the angular position of the rotor 2 of the sensorless synchronous motor-generator 100 when the rotor 2 stops to be correctly calculated. Based on the angular position of the rotor 2 when the rotor 2 stops, the engine can be restarted even after the full stop.

What is claimed is:

1. An idle-stop restart control system comprising:
   a sensorless synchronous motor-generator including an armature winding and a rotor including a field winding, the sensorless synchronous motor-generator operating as a generator after start of an engine and operating as a starting motor when the engine is restarted after idle stop;
   an induced-signal detecting circuit for detecting an induced signal output from the armature winding;
   a field drive circuit for controlling energization of the field winding; and
   a restart control circuit being configured to:
      output, to the field drive circuit, a drive signal for controlling the energization of the field winding to amplify the induced signal while calculating a number of revolutions and an angular position of the rotor based on the induced signal detected by the induced-signal detecting circuit when an engine stop command is input and a level of the induced signal detected by the induced-signal detecting circuit is equal to or less than a predetermined value; and
      output the drive signal for controlling the energization of the armature winding to restart the engine based on the calculated number of revolutions and angular position of the rotor when a restart command is input.

2. An idle-stop restart control system according to claim 1, further comprising an idle control circuit for outputting the engine stop command when conditions for judging engine stop are satisfied during idling and for outputting the restart command when a condition for judging restart is satisfied.

3. An idle-stop restart control system according to claim 1, wherein the restart control circuit is configured to:
   calculate the angular position of the rotor when the rotor stops from a relation between the angular position and the number of revolutions of the rotor at a predetermined elapsed time when the calculated number of revolutions of the rotor reaches a limit number of revolutions, which allows for detection of the induced signal; and
   output the drive signal for controlling the energization of the armature winding to restart the engine based on the calculated angular position of the rotor when the rotor stops in a case where the restart command is input after the number of revolutions of the rotor reaches the limit number of revolutions or after a full stop.

4. An idle-stop restart control system according to claim 2, further comprising:
   a brake switch for detecting a brake operation;
   a vehicle speed sensor for detecting a speed of a vehicle; and
   a shift position sensor for detecting a position of a shift lever,
   wherein the idle control circuit is configured to:
   determine that the conditions for judging the engine stop are satisfied when the brake operation is detected by the brake switch, the speed of the vehicle detected by the vehicle speed sensor is zero, and the position of the shift lever detected by the shift position sensor is in a predetermined range causing the vehicle to continuously stop; and
   determine that the condition for judging the restart is satisfied when even anyone of the conditions for judging the engine stop is not satisfied.

* * * * *